United States Patent [19]

Hicks

[11] Patent Number: 5,321,465
[45] Date of Patent: Jun. 14, 1994

[54] FILM ANALYZER APPARATUS

[76] Inventor: Ray Hicks, 4444 W. Bristol Rd., Flint, Mich. 48507

[21] Appl. No.: 7,715

[22] Filed: Jan. 22, 1993

[51] Int. Cl.$^5$ .............................................. G03B 27/32
[52] U.S. Cl. ...................................................... 355/77
[58] Field of Search ........................ 355/38, 40, 41, 68, 355/77

[56] References Cited

U.S. PATENT DOCUMENTS

| | | | |
|---|---|---|---|
| 4,862,200 | 8/1989 | Hicks | 354/75 |
| 4,951,086 | 8/1990 | Hicks | 355/41 |
| 5,023,655 | 6/1991 | Hicks | 355/39 |
| 5,070,677 | 12/1991 | Hicks | 53/435 |
| 5,072,254 | 12/1991 | Hicks et al. | 355/50 |
| 5,072,256 | 12/1991 | Hicks | 355/71 |
| 5,093,682 | 3/1992 | Hicks | 355/1 |
| 5,097,292 | 3/1992 | Hicks | 355/75 |

*Primary Examiner*—D. Rutledge
*Attorney, Agent, or Firm*—Krass & Young

[57] ABSTRACT

A film analyzer apparatus wherein a plurality of strips of developed film are spliced together to form a roll, the roll is positioned on a feed reel, and the film is moved progressively through the apparatus past a scanning station in which the size of the film, the size of the exposure and its orientation is analyzed; thereafter past a cropping station where the film is composed by adjusting its position relative to a cropping template; thereafter past a color analyzer station where the film is adjusted for color balance and density balance; thereafter past a punching station where a unique binary code is punched into the edge of the film so as to identify each frame of the film with the particular database information associated with that frame; and thereafter onto a takeup reel to form an analyzed film roll which is thereafter fed to an automatic printer which prints each frame in accordance with the database information provided to the printer for that frame.

15 Claims, 5 Drawing Sheets

FILM ANALYZER APPARATUS

BACKGROUND OF THE INVENTION

This invention relates to apparatus for handling photographic film and more particularly to a method and apparatus for processing developed film prior to its delivery to an automatic printer.

In the current photolab environment, rolled film is developed in one step and then presented to various additional stations of the photolab for processing prior to delivery to the printer.

At a first station, the film may be provided a batch number together with individual frame numbers punched on the edge of the film.

At another station, the individual frame numbers punched on the edge of the film are correlated with the order information from the individual subject (that is, what numbers and sizes of prints of the subject are desired).

At a further station, the roll of photographic negative film is presented to an editing station where it is viewed on a monitor. Frames unsuitable for printing are marked on some media or in some database associated with the frame. Likewise frames selected for printing are annotated on some media or in some database with cropping information.

At a yet further station, the film is viewed on a color monitor and color balance information (density, green, red, and blue balance) are separately stored for each frame in some media or in some database.

In recent years the use of multi-format photographic film has further complicated the photoprocessing situation. In multi-format film different sizes and orientation of photographic exposures may appear on film having the same substrate size. For example 120 size film allows 10, 12, 15, or 16 exposures on a single roll. These exposures may be different sizes. On 220 size film there may be 20, 24, 30, or 32 exposures, again, having different orientations or sizes. This information regarding the film size, number of exposures, and orientation is critical because it affects the optical center of the negative.

The ultimate goal in all of this processing is to present to an automated photographic printer a complete database regarding each photograph. When the film arrives at the printer, ideally the printer will be able to operate automatically by correlating the punched film number information in the database with respect to film size; exposure or negative size; instructions to print or skip the frame; instructions with respect to the position of the optical center in X axis and Y axis; cropping information; density information; color coeffiency information; and order information. As indicated, this information is gathered by a plurality of operators at a plurality of stations utilizing a plurality of apparatuses. This multiplicity of operators, stations, and equipment add significantly to the cost and complexity of processing the film for delivery to the printer.

SUMMARY OF THE INVENTION

The invention film analyzer apparatus eliminates the need for separate punching stations, separate order stations, separate editing station, and separate color analysis stations. All of the work may be done by a single operator at a single station which will accommodate any type format and size of film.

The general purpose of the invention is to provide an integrated station that will allow for viewing, composing, marking, and order entry information while collecting color printing parameters. This makes the operator more efficient and reduces the number of operators and machines required in a typical photographic lab.

The invention apparatus also eliminates the need for segregation of different film sizes prior to editing and further eliminates the need for separate setups for each segregated film size.

In accordance with the invention method and apparatus, developed film is spliced into roll form and received at the improved analyze apparatus. The roll is treated as a batch and each individual roll making up the batch is provided with an identifying number called a "twin check." This twin check number may appear as a punch or a mark on the film which is machine readable. It is applied to the leader of each discrete roll of film within the batch to give the roll unique identity.

The batch of film is mounted on an analyzer drive transport mechanism which is connected to a computer having suitable storage means. A batch number is entered to identify the batch. This may be done by either bar code or by a manual entry. All subsequent information collected and entered during the analyzing process will correlate to this overall batch number.

The machine operator then advances the film to the first frame. During the advance process, a scanning mechanism on the analyzer senses the size of the film, the size of the exposure and its orientation. The analyzer drive automatically adjusts the position of the film in relation to the optical center line of the analyzer so as to precisely position the X and Y center line so that the film is on the X and Y center line of an optical stage. Attached to the center of the analyzer drive is a cropping template in the form of a clear plexiglass plate which overlays and is centered on the optical center of each exposure. The operator can them compose the film by adjusting its position in relation to the cropping template. The cropping information is then stored in the database. This process not only establishes a center for the finished print, but also indicates the amount on the negative that will be included in the finished photograph. The cropping template is marked to indicate standard geometries of print sizes and cropping available on the machine which will do the final printing. The template will also indicate where cropping will occur for both vertical and horizontal edges of the film and for landscape versus portrait formats.

The operator then positions the negative for composition (left and right, up and down and selected crop area) and this data is stored in the database.

The operator then performs color balance and the density and color-balancing information is stored in the database.

Once the composition and color balance is completed, the operator will select a number and type of photograph which will be produced at the printer for each frame. Once this information has been completely entered, the operator presses a key on the keyboard which causes all of the data regarding editing, composition and order information to be stored in the database and advances the film to a frame punching device which punches a code into the edge of the film indicating the frame or sequence number of the frame just completed. The above procedure continues for the entire length of the film.

According to an important feature of the invention methodology, a database is provided; each frame is composed and data is provided to the database for each frame; color analysis is performed on each frame and color analysis data is entered into the database for each frame; each frame is identified in the database with its respective composition and code analysis data; and each frame is physically coded in machine readable form so that the automated printer may machine read each frame and receive the stored composition and color analysis data for that frame.

According to a further feature of the invention methodology, the method includes the further step of providing order information data to the database for each frame so that the printer will also receive the stored order information data for that frame.

According to a further feature of the invention methodology, the method includes the further step of providing orientation data to the database for each frame so that the printer will also receive the stored orientation data for that frame.

According to a further feature of the invention methodology, the method includes the further step of providing selection data to the database for each frame so that the printer will also receive the stored selection data for that frame.

According to a further feature of the invention methodology, the composition data provided to the database for each frame includes X and Y axis information and cropping information.

According to a further feature of the invention methodology, the color analysis data provided to the database for each frame includes color coefficient information and density information.

According to a further feature of the invention methodology, a database is provided; a batch of developed film is provided in roll form and including a plurality of frames; a roll of film is positioned on a film feed reel; a takeup reel is provided; the film moves progressively frame by frame along a path extending from the feed reel to the takeup reel; and during the movement of the film along the path each frame is composed and color analyzed, and composition and color analysis data is entered into the database for each frame.

According to a further feature of the invention methodology, the method includes the further step of marking each frame in machine readable form as it moves along the path with a code that identifies the frame with the composition and color analysis data stored in the database for that frame.

According to an important feature of the invention film analyzer apparatus, the apparatus includes a film feed device; a film takeup device; means defining a film path extending along an X axis between the film feed device and the film takeup device; means for driving the film strip along the path; a film sensor positioned along the path and operative to generate information indicative of the optical center of each frame along the X axis; a template assembly positioned along the path and operative to generate information indicative of the optical center of each frame along the Y axis; and a punch positioned along the path and operative to punch a code into each frame to identify the frame.

According to a further feature of the invention apparatus, the apparatus further includes a database and data entry means operative to enter the sensor and template assembly information into the database for each frame and to identify the entered information with the cod information punched into the respective frame.

According to a further feature of the invention apparatus, the apparatus further includes a color analyzer positioned along the path and operate to generate color coefficient information for entry into the database information for each frame.

DETAILED DESCRIPTION OF THE PREFERRED EMBODIMENT

Figure 1:
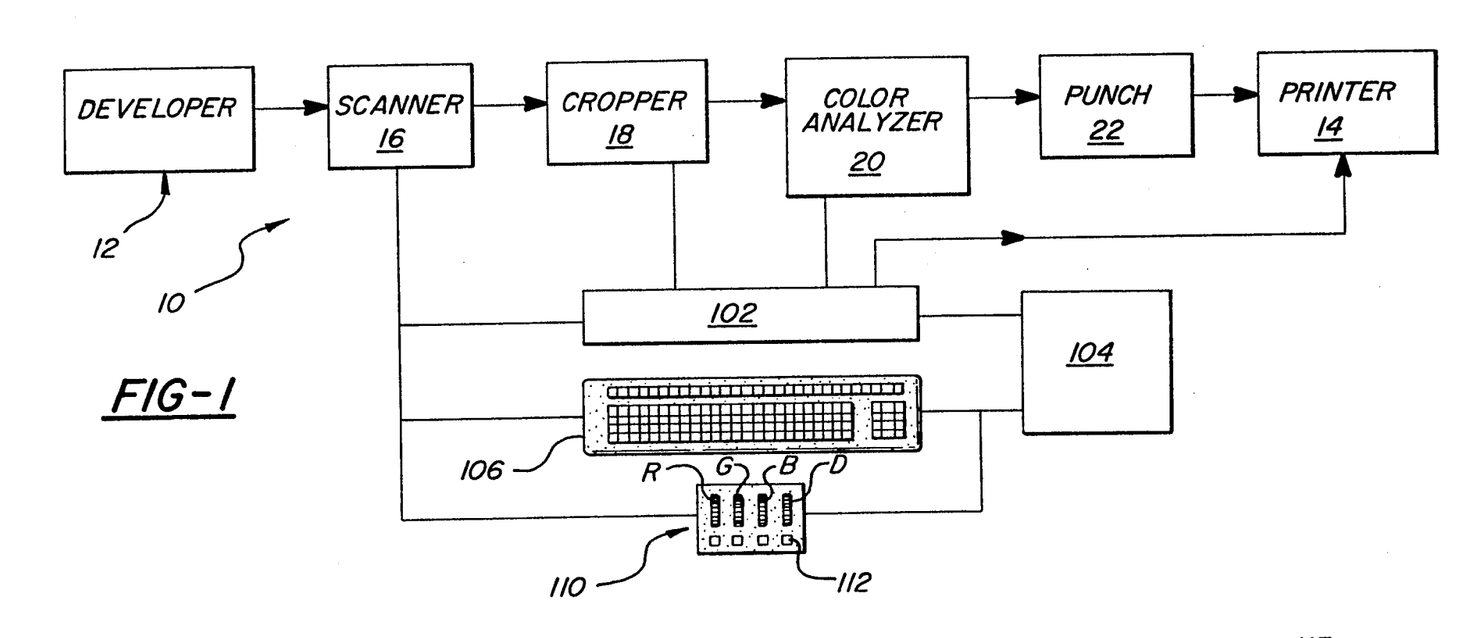
FIG. 1 is a diagrammatic view depicting the overall methodology and apparatus of the invention.
Figure 2:
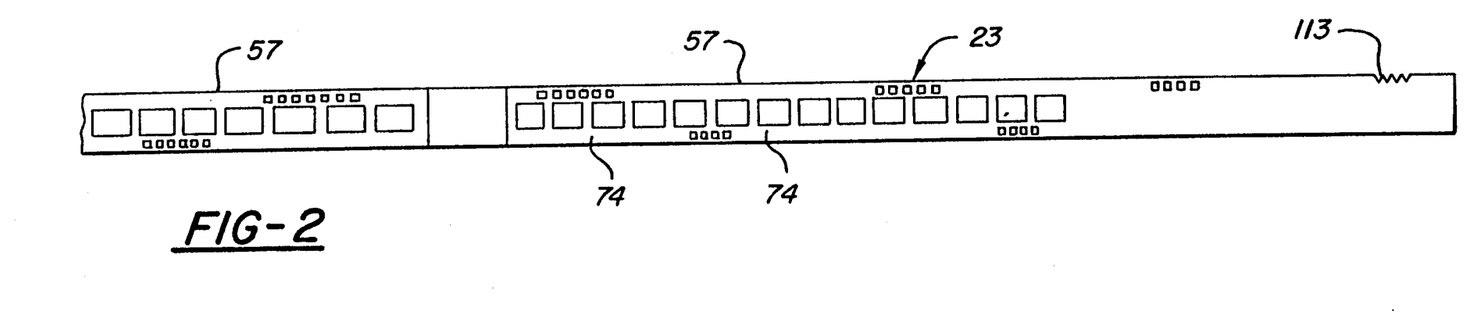
FIG. 2 is a fragmentary view of film as it is moved through the film processing operation.
Figures 3, 7:
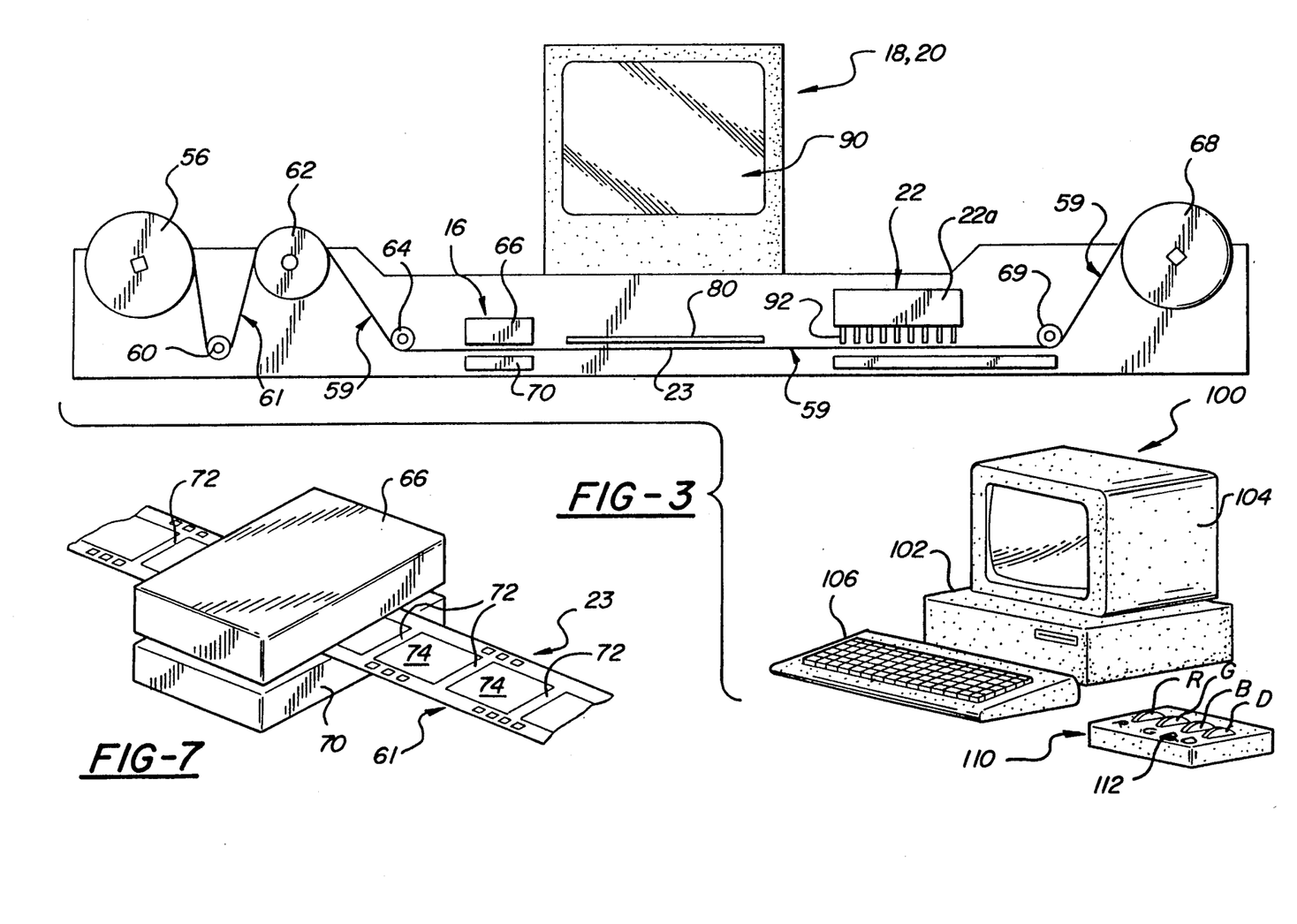
FIG. 3 is a elevational somewhat schematic view of a film analyzer apparatus according to the invention.
FIG. 6 and 7 are detail views of the invention apparatus.
Figure 4:
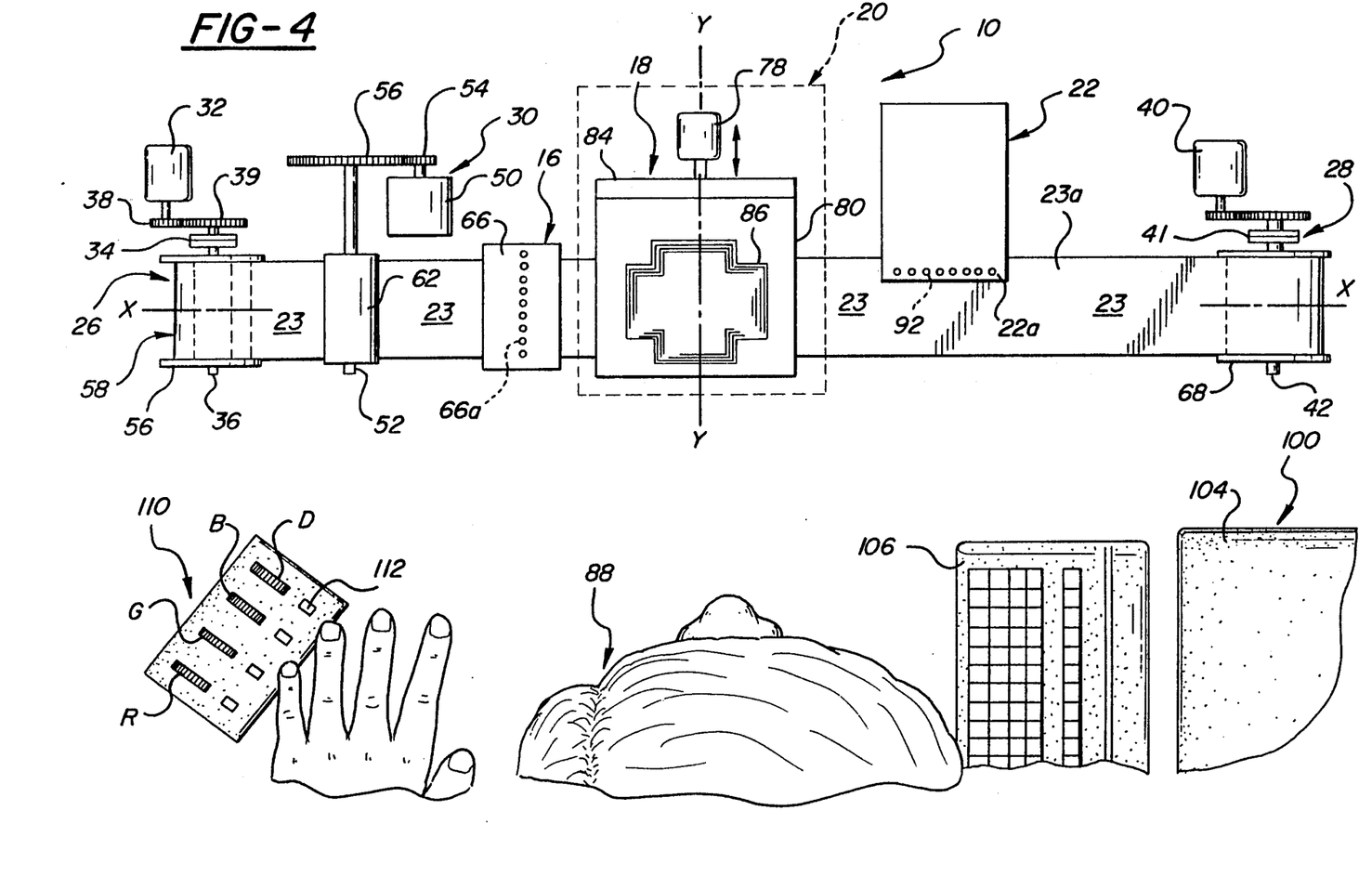
FIG. 4 is a plan view of the apparatus of FIG. 3.
Figure 5:
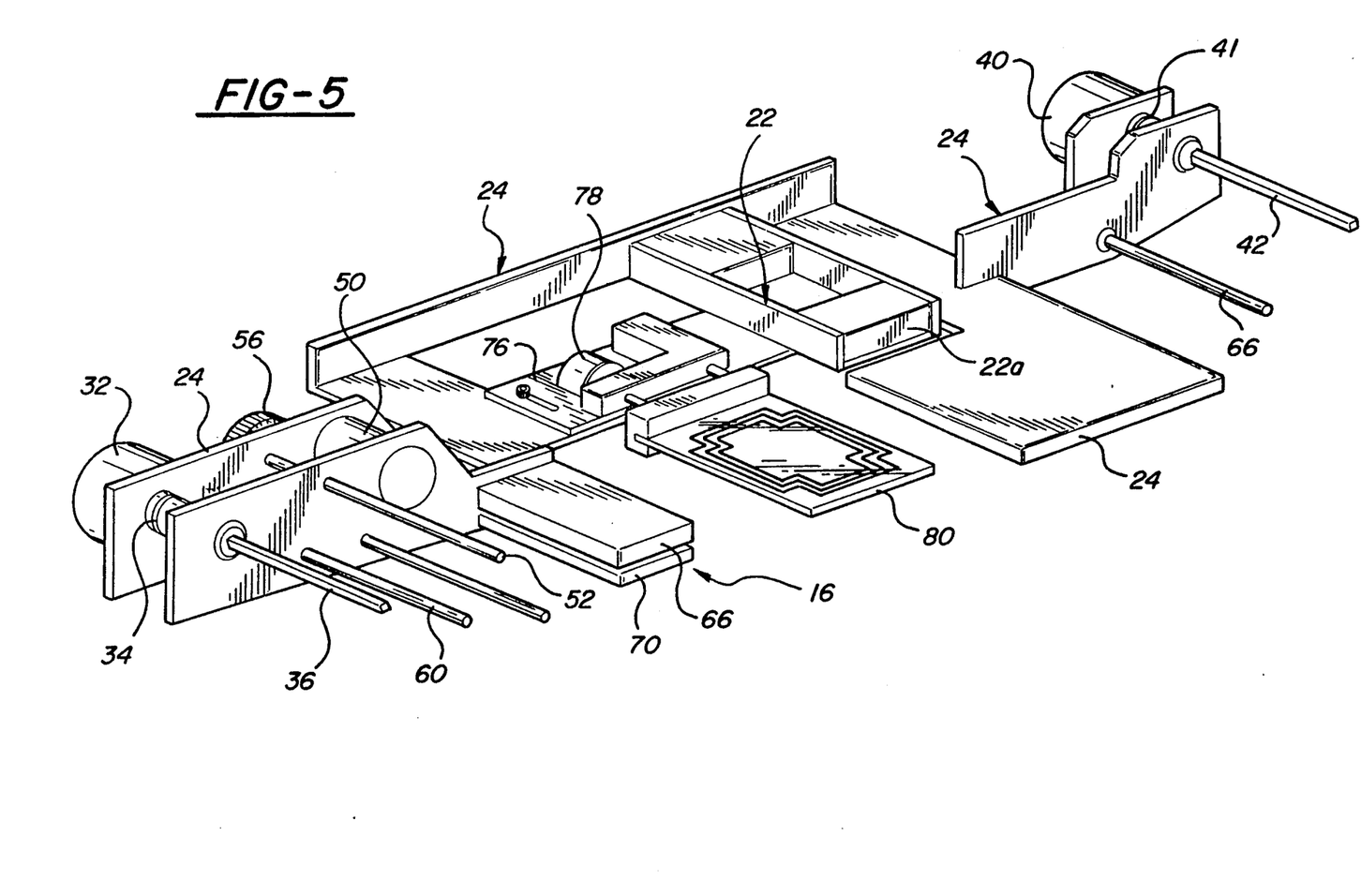
FIG. 5 is a perspective view of the apparatus of FIGS. 3 and 4.
Figure 6:
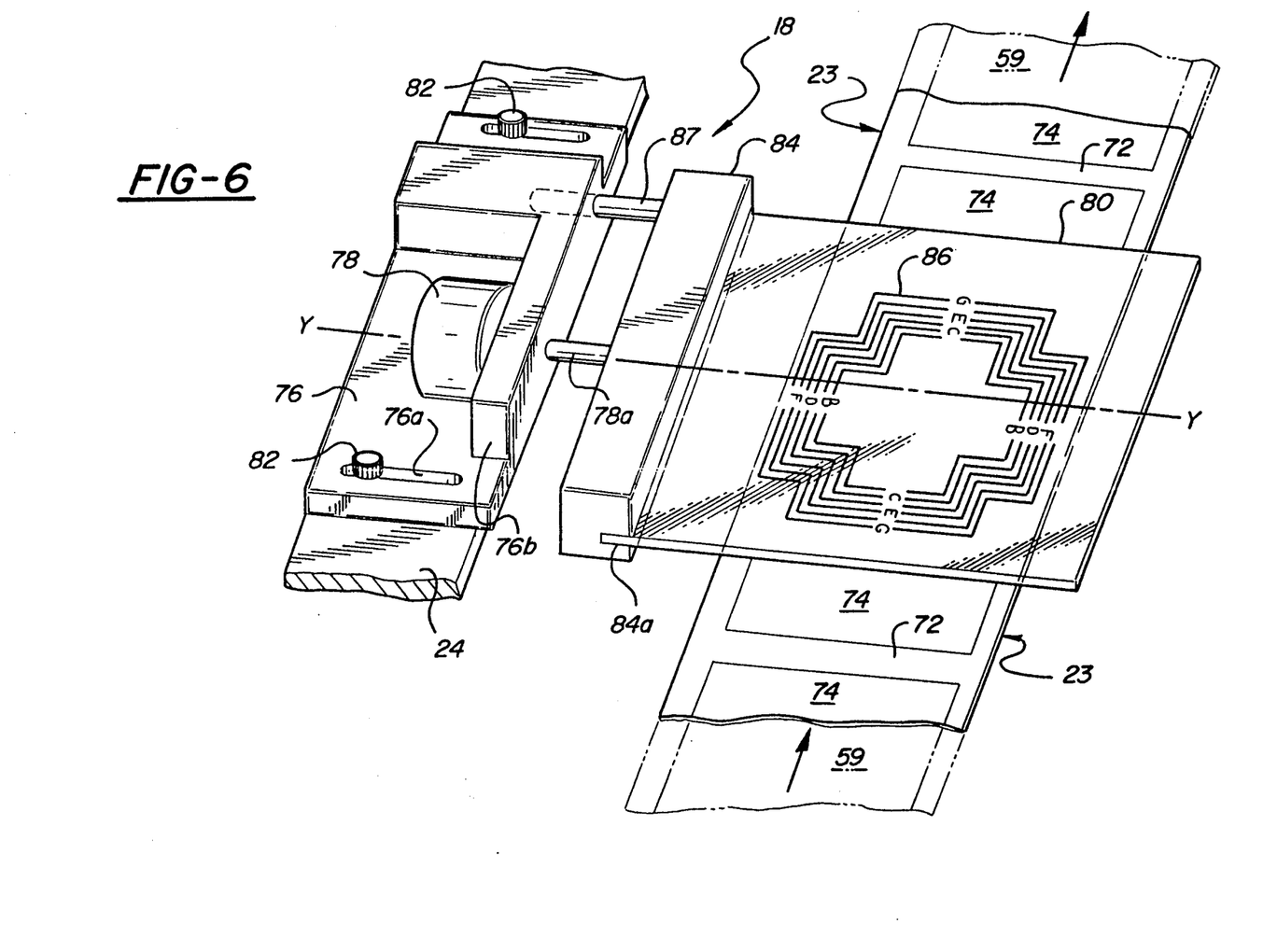

The invention film analyzer apparatus 10 is utilized as a part of a total film processing procedure (as seen in FIG. 1) wherein film is developed in known manner at a station 12, delivered to the invention film analyzer apparatus 10, and thereafter delivered to an automated photographic printer 14 for production of the final photographic prints. It will be understood that the invention film analyzer apparatus serves to receive the developed film from the developer 12 and perform various operations and analyses on the developed film, whereafter the analyzed film may be delivered &:o the automated photographic printer 14 where information generated in the movement of the film through the apparatus 10 is utilized to produce the final photographic prints.

Apparatus 10, broadly considered, includes a scanning station 16, a cropping station 18, a color analyzer station 20, and a punch station 22. A roll of film 23 is moved in roll form through the apparatus 10 by a film transport device including a frame 24, a film tensioning device 26, a further film tensioning device 28, and a film incremental feed device 30.

Film tensioning device 26 includes an electric motor 32, a clutch 34, and a tensioning drive shaft 36. Motor 32 drives a pinion gear 38 which in turn drives a drive gear 39 which in turn drives tensioning drive shaft 36 through clutch 34.

Film tensioning device 28 includes a motor 40, a clutch 41, and a film tensioning shaft 42. Motor 38 drives a pinion 44 which in turn drives a drive gear 46 which in turn drives tensioning drive shaft 42 through clutch 41.

Film incremental feed drive 30 includes a stepper motor 50 and a stepping drive shaft 52. Motor 50 drives a pinion gear 54 which in turn drives a drive gear 56 connected to stepper drive shaft 52.

A plurality of processed film strips 57 from developer 15 are spliced together to form an elongated strip which is mounted as a roll 58 on a reel 56 which is in turn mounted on tensioning drive shaft 36. The film 23 from roll 58 on reel 56 is then fed along a path 59 extending downwardly around an idler shaft 60, thereafter upwardly over a drive roller 62 mounted on stepper motor shaft 52, thereafter downwardly under a further idler shaft 64, thereafter past scanner 16, cropper 18, color analyzer 20, and thereafter beneath a further idler roller 66 for passage upwardly for receipt on a takeup reel 68 mounted on tensioning drive shaft 42.

It will be understood that the film is driven through the invention film analyzer apparatus incrementally by stepper motor 50 with film tensioning drive 26 acting through clutch 34 to maintain tension on the film pulling the film toward the feed end of the apparatus and with film tensioning device 28 acting through clutch 41 to maintain a tension on the film pulling the film toward the film takeup end of the apparatus.

Scanner 16 includes a light sensor device 66 mounted on the frame 24 in overlying relation to the film path 59 and an illumination device 70 mounted on the frame 24 in underlying relation to light sensor device 66 and film path 59. Sensor 66 is adapted to locate the interframe borders 72 between successive frames 74 on the film 23 and by doing so locate the edges of the frame. With this information the center of the frame can be located (i.e. half way between the edges) and the frame can be accurately positioned on the optical stage of the associated printer 14.

In operation, illumination device 70 transmits light through the film for reception by the light sensor device 66. For example, light sensor device 66 may include eight light sensors 66a positioned in a linear array extending transverse to the film path and corresponding to the image size or width of 70 millimeter film. All eight sensors would be used for 70 millimeter film or a selected subplurality of light sensors would be used to correspond to smaller film width sizes such as four sensors corresponding to 35 millimeter film. Further details of the manner in which scanner 16 operates to locate the centers of the frames 74 of the film is disclosed in applicant's copending U.S. patent application Ser. No. 816135 filed on Dec. 31 1991.

Cropper 18 includes a mounting plate 76, a linear actuator 78, and a cropping template 80. Mounting plate 76 is mounted on frame 24 and is adjustable relative to the frame by the coaction of set screws 82 and mounting plate slots 76. Linear actuator 78 is mounted against the rear face of an upstanding rib 76b of mounting plate 76 and includes a linear actuator shaft 78a extending forwardly from mounting plate rib portion 76b for connection to a template holder bar 84 including a groove 84a receiving the rear edge portion of the template 80 to position the template 80 in overlying relation to the film path 59. Template 80 is formed, for example, of a clear plexiglass material and includes a plurality of markings 86 indicating standard geometries, print sizes, and croppings available on the apparatus. The markings 86 also indicate where the cropping will fall for vertical (portrait) and horizontal (landscape) croppings. Selective actuation of linear actuator 78 moves template 80 selectively along the Y axis of the apparatus with the movement stabilized by a stabilizer bar 87 secured to holder bar 84 and received in a guide bore in mounting plate 76.

Color analyzer 20 is positioned in overlying relation to template 80 and includes a monitor 90 on which the frame of film positioned beneath template 82 may be projected in known manner to enable an operator 88 viewing the image of the frame on the monitor to adjust a series of suitable controls to make the density and color balance of the exposure subjectively equal to that of known standards. Color analyzer 20 may, for example, be of the type available from Kodak under the designation VCNA or PVAC or from Bremson under the designation CVIS.

Punch 22 is positioned proximate film path 59 with its front edge portion 22a in overlying relation to the rear edge portion 23a of the film so that a series of punches 92 carried by the front edge portion of the punch may be selectively actuated to punch a unique code into the border of each frame of the film in accordance with a binary code. The punch is preferably a pneumatic film punch of the type available from Hicks Equipment Company of Flint, Mich. as Part No. 500816.

The invention film analyzer apparatus further includes a data processor 100 including a database 102, a monitor 104, and a keyboard 106. It is to be understood that the processor 100 will be positioned so that keyboard 106 is conveniently assessable to operator 88 with the operator positioned to conveniently view monitor 90 of color analyzer 20.

OPERATION

The invention film analyzer apparatus 10, in broad overview, allows a single operator 88 to receive developed film from the developer 12 in batch form, perform composition, color analysis and density analysis operations on each frame of the film, enter the composition, color analysis, and density analysis information for the frame into a database, enter select or reject information into the database, enter order information for the frame into the database, and punch the frame with a unique binary code to identify the frame with its database information, whereafter the film batch may be delivered to automated printer 14 which will identify each frame based on its unique punched binary code and produce final prints from the frame exposure based on the stored database information for that frame.

Specifically, a plurality of strips 57 of processed film from the developer 12 are spliced into roll form and mounted on reel 56. The individual strips need not be of identical format but, rather, film strips having different frame sizes may be spliced together in the same roll. Reel 56 carrying the spliced film roll is then mounted on tensioning drive shaft 36 and a leader for the film is thereafter threaded around shaft 60, around drive roller 62, around idler shaft 64, between light sensor device 66 and illumination device 70 of sensor 16, beneath template 80, beneath punch front edge portion 22a, beneath idler roller 66, and onto takeup reel 68 mounted on tensioning drive shaft 42. Tensioning motors 32 and 40 are now actuated to produce tensioning forces acting through their respective clutches to respectively pull the film toward the feed end of the apparatus and toward the takeup end of the apparatus, whereby to maintain tension on the film, whereafter the operator may selectively advance the film frame-by-frame through the apparatus utilizing stepper motor 50, stepper drive shaft 52, and drive roller 62. Incremental stepping movement of the film through the apparatus may be achieved by controls incorporated in the keyboard 106 of data processor 100, or may, alternatively, be controlled by a separate keyboard 110 positioned proximate the operator 88 and including suitable control members 112 for stepping the film selectively through the apparatus. Prior to installation on the apparatus, each roll or batch is provided with an identifying signature 113 called a "twin check" which may appear as a punch or a mark o the film which is machine readable. The mark is applied to the leader of each roll of film to give the roll or batch a unique identity. The batch number is also entered into the database to identify the batch. Entry may be either by bar code or by manual entry. All subsequent information collected and entered during the analyzing process will correlate to this overall batch number.

The machine operator now advances the film to the first frame utilizing the stepper motor 50. During the advancing process, the scanner 16 senses the size of the film (for example, 35 mm or 70 mm); the size of the frames (for example, 6×7, 6×6, or 6×4.5); and the orientation of the film (portrait, or vertical, landscape or horizontal). The information generated by the scanner is used both in real time and, optionally, in the database. The scanner information is used immediately to ascertain real time offsets. This is the same for the X axis centering of the film. The Y axis centering of the film is achieved by selective movement of the cropper 18.

Template 80 overlays and is centered on the optical center of each exposure where the operator can now compose the frame of the film by adjusting its position in relation to the cropping template. The cropping information is then stored in the database. This process not only establishes a center for the finished print, but also indicates the amount of negative that will be included in the finished photograph. Template 80 is marked at 86 to indicate standard geometries of print sizes and cropping available on the machine which will do the final printing. The template will also indicate where cropping will occur for both vertical and horizontal edges of the film and for landscape versus portrait formats. The operator selectively positions the frame on the template by actuation of linear motor 78 and this information is stored in the database.

The operator now performs color balance operations on the frame and density balance operations on the frame. This is achieved by projecting the frame image in known manner on the monitor 90 of the color analyzer 20 and then selectively adjusting R (red), B (blue), and G (green) dials on the control 110 The color analysis is performed by comparing the visual appearance of the image on the monitor 90 with certain learned parameters so as to ensure that the print produced by the automatic printer will have suitable red, green, and blue color characteristics. The operator also at this time adjusts a D (density) dial on the control 110, again comparing the visual appearance of the image with a learned density parameter. The settings of the dials R, G, B, and D are now entered in the database.

The operator also at this time enters into the database instructions as to whether to print or skip the frame (if the frame is defective in some manner) and also enters order information with respect to the frame, such as the number and size of prints to be made from the specific frame.

The operator now actuates punch 22 to impart a unique binary code to the edge of the film so as to identify the particular frame with the data stored in the database for that frame. This process is repeated for each frame in the roll until all frames have been analyzed and the film has been wound completely onto takeup reel 68.

The analyzed roll or batch is now delivered to the printer. As the analyzed film moves through the printer, the "twin check" mark on the film leader is machine read to correlate the roll with the database information stored for that roll and the binary code on each frame is machine read so as to access the unique data stored in the database corresponding to that frame and so as to enable the printer to decide whether to print or reject the frame; to accurately position the X and Y axes of the frame on the optical stage of the printer; to perform the proper cropping operations on the frame; to produce the number and size of prints as dictated by the order information; to provide a proper density for the finished prints; and provide proper red, green, and blue color characteristics for the finished prints.

The invention will be seen to provide an integrated station that will allow for viewing, composing, marking and order entry information, while collecting color printing and density parameters, thereby making the operator more efficient and reducing the number of operators and machines required in a typical photographic lab. The invention apparatus further eliminates the need for segregation of different known film formats but rather allows different film formats to be spliced together into a common roll or batch, thereby eliminating the need to separately process each film format size.

Whereas a preferred embodiment of the invention has been illustrated and described in detail it will be apparent that various changes may be made in the disclosed embodiment without departing from the scope or spirit of the invention.

I claim:

1. A method of analyzing developed film, including a plurality of frames, prior to its delivery to an automatic printer for production of photographic prints, the method comprising the steps of:
    providing a database;
    moving the film along a single film path extending from a feed location to a take-up location;
    composing each frame as the film is moved along the path and providing composition data to the database for each frame;
    color analyzing each frame as the frame is moved along the path and providing color analysis data to the database for each frame;
    identifying each frame in the database with its respective composition and color analysis data; and
    physically and uniquely coding each frame in machine readable form as the film is moved along the path so that the automated printer may machine read each frame and receive the stored composition and color analysis data for that frame.

2. A method according to claim 1 wherein the method includes the further step of providing order information data to the database for each frame so that the printer will also receive the stored order information data for that frame.

3. A method according to claim 1 wherein the method includes the further step of providing selection or rejection data to the database for each frame so that the printer will also receive stored selection data for that frame.

4. A method according to claim 1 wherein the composition data provided to the database for each frame includes X and Y axis information and cropping information.

5. A method according to claim 1 wherein the color analysis data provided to the database for each frame includes color coefficient information and density information.

6. A method of analyzing a batch of developed film prior to its delivery to a printer for production of final photographic prints, characterized in that at least two of the steps comprising color analysis, composition, density analysis, and cropping are performed on the film as the film is moved between a feed roll and a takeup roll.

7. A method according to claim 6 wherein said at least two steps comprise color analysis and composition.

8. A method according to claim 7 wherein the step of cropping is also performed as the film is moved between the feed roll and the takeup roll.

9. A method according to claim 7 wherein the step of density analysis is also performed as the film is moved between the feed roll and the takeup roll.

10. A method of analyzing developed film. comprising:
providing a database;
providing a batch of developed film, including a plurality of frames, in roll form;
positioning the roll of developed film on a film feed reel;
providing a takeup reel;
moving the film progressively frame by frame along a path extending from the feed reel to the takeup reel; and
during the movement of the film along said path, composing each frame, color analyzing each frame, and providing composition and color analysis data to the database for each frame.

11. A method according to claim 10 and including the further step of marking each frame in machine readable form as it moves along said path with a code that identifies the frame with the composition and color analysis data stored in the database for that frame.

12. A device for processing a strip of developed film including a series of frames, said device comprising:
a film feed device;
a film takeup device;
means defining a film path extending between the film feed device and the film takeup device;
means for driving the film strip along said path;
a film sensor position along said path and operative to generate information indicative of the optical center of each frame along the X axis;
a template assembly positioned along each path and operative to generate information indicative of the optical center of each frame along a Y axis; and
a punch positioned along said path and operative to punch a code into each frame to identify the frame.

13. A device according to claim 12 wherein the device further includes:
a database; and
data entry means operative to en and template assembly information into said database for each frame and to identify the entered information with the code information punched into the respective frame.

14. A device according to claim 13 wherein said device further includes:
a color analyzer positioned along said path and operative to generate color coefficient information for each frame; and
said data entry means is operative to enter said color coefficient information into said database for each frame.

15. A method of analyzing developed film, including a plurality of frames, prior to its delivery to an automatic printer for production of photographic prints, the method comprising the steps of:
providing a database;
composing each frame and providing composition data to the database for each frame;
color analyzing each frame and providing color analysis data to the database for each frame;
providing orientation information data to the database for each frame;
identifying each frame in the database with its respective composition, orientation and color analysis data; and
physically coding each frame in machine readable form so that the automated printer may machine read each frame and receive the stored composition, color analysis and orientation data for that frame.

* * * * *

UNITED STATES PATENT AND TRADEMARK OFFICE
CERTIFICATE OF CORRECTION

PATENT NO. : 5,321,465
DATED : June 14, 1994
INVENTOR(S) : Ray Hicks

It is certified that error appears in the above-indentified patent and that said Letters Patent is hereby corrected as shown below:

Column 2, Line 11, please delete "analyze" and insert --analyzer-

Column 2, Line 37, please delete "them" and insert --then--.

Column 3, Line 67, please delete "cod" and insert --code--.

Column 4, Line 3, please delete "operate" and insert --operative-

Column 4, Line 12, please delete "a" and insert --an--.

Column 4, Line 17, please delete "Fig." and insert --Figs.--.

Column 4, Line 33, please delete "&:0" and insert --to--.

Column 5, Line 35, please delete "31" and insert --31,--.

Column 6, Line 64, please delete "o" and insert --on--.

Column 7, Line 37, please delete "110" and insert --110.--.

Column 10, Line 9, please delete "en and" and insert --enter said sensor and--.

Signed and Sealed this

Eleventh Day of October, 1994

Attest:

BRUCE LEHMAN

Attesting Officer

Commissioner of Patents and Trademarks